United States Patent [19]

Umpleby

[11] Patent Number: 4,959,413

[45] Date of Patent: Sep. 25, 1990

[54] CROSSLINKABLE POLYMERS

[75] Inventor: Jeffrey D. Umpleby, Princeton, N.J.

[73] Assignee: BP Chemicals Limited, London, England

[21] Appl. No.: 312,590

[22] PCT Filed: Jun. 8, 1988

[86] PCT No.: PCT/GB88/00448

§ 371 Date: Jan. 27, 1989

§ 102(e) Date: Jan. 27, 1989

[30] Foreign Application Priority Data

Jun. 13, 1987 [GB] United Kingdom ............... 8713867

[51] Int. Cl.⁵ .............................................. C08F 8/00
[52] U.S. Cl. ................................... 525/100; 525/105; 525/106
[58] Field of Search .................... 525/100, 105, 106

[56] References Cited

U.S. PATENT DOCUMENTS 3,775,386 11/1973 Citron .............................. 260/80.3
4,812,519 3/1989 Gillette ............................. 525/105

FOREIGN PATENT DOCUMENTS 0150773 8/1985 European Pat. Off. .
0150774 8/1985 European Pat. Off. .
2030899 11/1970 France .
2146066 2/1973 France .

*Primary Examiner*—Melvyn I. Marquis
*Attorney, Agent, or Firm*—Brooks Haidt Haffner & Delahunty

[57] ABSTRACT

Crosslinkable polymers prepared by reacting a polymer with an azido silane having the general formula $$N_3-(X)_m Si(OR)_3$$

wherein X is a divalent hydrocarbyl group having one to six carbon atoms and
R is an alkyl group containing one to twenty carbon atoms and
m is zero or one the reaction being carried out under conditions which cause the azidosilane to graft to the polymer with the elimination of nitrogen gas.

10 Claims, No Drawings

CROSSLINKABLE POLYMERS

The present invention relates to crosslinkable organic polymers and to a process for preparing such polymers. More particularly the present invention is concerned with crosslinkable organic polymers comprising hydrolysable silane groups, which polymers can be thermoformed into shaped articles, for example cable insulation or pipe, and subsequently crosslinked by contacting the articles with water or steam in the presence of a so-called "silanol condensation catalyst". The invention further relates to a process for extruding articles from the crosslinkable polymers or from compositions based thereon.

It is known that organic polymers containing hydrolysable silane groups can be crosslinked by the action of water, preferably in the presence of a silanol condensation catalyst. A number of methods are known for producing such crosslinkable organic polymers. One method comprises copolymerising unsaturated organic monomers, for example, ethylenically unsaturated or vinyl monomers, with unsaturated silane compounds containing hydrolysable groups. Examples of this method are described in GB-A-No. 2028831 and GB-A-No. 2039513 which disclose the preparation of crosslinkable copolymers of ethylene and an ethylenically unsaturated silane compound by copolymerising the monomers at relatively high temperatures and pressures in the presence of a radical polymerisation initiator.

It is also well-known that polymers crosslinkable by the action of water and a silanol condensation catalyst can be prepared by grafting an unsaturated silane compound on to a preformed polymeric material. Grafting processes of this type can be carried out by heating together a base polymer, for example polyethylene, an unsaturated silane compound bearing one or more hydrolysable groups, a grafting initiator and optionally a silenol condensation catalyst, under conditions such that the unsaturated silane compound is grafted on to the base polymer. Examples of this method are disclosed in GB-A-No. 1357549, GB-A-No. 1234034 and GB-A-No. 1286460. An example of a commercial process which employs a grafting reaction of this type is the SIOPLAS (RTM) process. In this process, the base polymer is heated with the unsaturated silane in the presence of a grafting initiator and the product is extruded and pellated to produce a pellated silane-grafted thermoplastic polymer. The pellated polymer can then be fed with a silanol condensation catalyst to a thermoforming process for fabricating shaped products. These shaped products are then crosslinked by exposure to water or steam.

It is also known that water curable polymers can be prepared by reacting a polymer with an azidosilane. European patent application EP-A-No. 150 773 discloses a water curable Polymer of a hydrolysable, azide sulphonylsilane and a substantially linear, low pressure ethylene polymer having a density of about 0.85 to about 0.97. European patent application EP-A-No. 150774 discloses a water curable polymer of a hydrolysable, azide sulphonyl silane and an alkylene alkyl acrylate copolymer. British Pat. No. 1 377 737 discloses a process for preparing a crosslinked polyolefin which comprises exposing a polyolefin in contact with an organosilicon compound having an azidoformate group to ultra violet radiation and/or a temperature above 130° C. and thereafter contacting the product with water in the presence of a metal carboxylate, a titanium ester or a titanium chelate.

A problem with water curable polymers produced using azide sulphonyl silane or an organosilicon compound having an azidoformate group is that the azidosulphonyl groups and azidoformate groups can undergo hydrolysis, splitting the hydrolysable silane groups from the polymer backbone. Also, hydrolysable azido sulphonyl silanes are highly explosive and are therefore difficult to handle and to react with the polymer.

The present invention relates to crosslinkable polymers prepared by reacting a polymer with an azido silane which is free from azido sulphonyl groups and azido formate groups and overcomes or at least mitigates the problems of the use of azido silanes containing such groups. The polymers can be readily prepared from commercial polymers without the need to employ a free radical initiator.

Accordingly the present invention provides a crosslinkable polymer comprising an organic polymer and pendant substituents having the general formula:

$$-NQ(X)_m Si(OR)_3$$

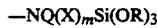

wherein the nitrogen atom N is connected to a carbon atom in the organic polymer, Q is a hydrogen atom or represents an additional connection to a carbon atom present in the organic polymer, X is a divalent hydrocarbyl group having one to six carbon atoms, m is zero or one and R is an alkyl group containing one to twenty carbon atoms.

The organic polymer can be a hydrocarbon polymer comprising only carbon-hydrogen and carbon-carbon bonds, prior to the reaction with the azidosilane. The pendant substituents will generally comprise from 0.1 to 20 weight percent of the total weight of the crosslinkable polymer.

The present invention further provides a crosslinkable polymer comprising either
(A) 80 to 99.9 weight percent of polymerised or copolymerised units of one or more monomers A' selected from ethylene and $C_3$ to $C_{12}$ alpha-olefins, or
(B) 50 to 99.8 weight percent of copolymerised units of one or more monomers A' selected from ethylene and $C_3$ to $C_{12}$ alpha-olefins and 0.1 to 49.9 weight percent of one or more comonomers B' selected from alkyl esters of unsaturated carboxylic acids, alkylene esters of saturated carboxylic acids alkylene ethers and unsaturated nitriles and
(C) 0.1 to 20 weight percent of pendant substituents having the general formula:

$$-NQ(X)_m Si(OR)_3$$

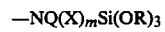

wherein the nitrogen atom N is connected to a carbon atom in an A or B unit, Q is a hydrogen atom or represents an additional connection to a carbon atom present in an A or B unit, X is a divalent hydrocarbyl group having one to six carbon atoms, m is zero or one and R is an alkyl group containing one to twenty carbon atoms.

The present invention further provides a process for preparing crosslinkable polymer comprising reacting together a mixture comprising
(A) an azidosilane compound having the general formula:

$$N_3-(X)_m Si(OR)_3$$

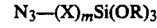

wherein X is a divalent hydrocarbyl group having one to six carbon atoms, R is an alkyl group containing one to twenty carbon atoms and m is zero or one, and an an organic polymer which is either, (B) a polymer or copolymer D of one or more monomers A' selected from ethylene and $C_3$ to $C_{12}$ alpha-olefins, or (C) a copolymer E comprising 50 to 99.9 weight percent of copolymerised units of one or more monomers A' selected from ethylene and $C_3$ to $C_{12}$ alpha-olefins, and 0.1 to 50 weight percent of copolymerised units of one or more monomers B' selected from alkyl esters of unsaturated carboxylic acids, alkylene esters of saturated carboxylic acids, alkylene ethers and acrylonitrile: the reaction being carried out under conditions which cause the azidosilane to graft to the polymer with the elimination of nitrogen gas.

In the formulae recited above m is preferably one. X is preferably methylene, dimethylene or trimethylene. R is preferably methyl, ethyl, n-propyl or n-butyl.

The quantity of the pendant silicon-containing substituents in the crosslinkable polymer of the present invention is preferably in the range 0.2 to 10 weight %, more preferably in the range 0.5 to 3 weight % based on total crosslinkable polymer.

Examples of azidosilanes suitable for use in the process of the present invention are azido propyl triethoxy silane $[N_3(CH_2)_3Si(OCH_2CH_3)_3]$ and azido propyltrimethoxy silane. The quantity of azido silane employed is suitably sufficient to provide a quantity of silicon-containing substituents corresponding to the ranges hereinbefore recited.

The polymer or copolymer D employed in the process of the present invention is a preferred starting material from which the units A in the crosslinkable polymer of the present invention are derived. Similarly, the polymer or copolymer E is a preferred starting material from which the alternative units B in the crosslinkable polymer of the present invention are derived.

Examples of suitable organic polymers are polyethylene, polypropylene, polyisobutene, polystyrene, polyvinylchloride, polybutadiene, polyamide, polyurethane, polyester and silane modified polyolefins, and blends thereof.

Examples of polymer or copolymer D are low density polyethylene (LDPE) made by the high pressure free radical initiated process; homopolymers and copolymers of ethylene made using transition metal-based catalyst, for example high density ethylene homopolymer, high, medium or low density copolymers of ethylene with one or more alpha-olefins, particularly with propylene, n-butene, 4-methylpentene-1, n-hexene, n-octene or n-decene, polypropylene, ethylene-propylene rubber (EPR) or ethylene-propylene-diene monomer elastomer (EPDM). Linear low density polyethylene (LLDPE), for example copolymers of ethylene with 1 to 10 mole % of n-butene and/or 4-methylpentene-1 made by the gas-fluidised bed transition metal-catalysed process are preferred copolyolefins. Examples of copolymers E are ethylene/ethylacrylate, ethylene/butyl acrylate, ethylene/methyl methacrylate, ethylene/vinylacetate, ethylene/vinylether and ethylene/acrylonitrile. Preferred as the polymer or copolymer employed in the process of the present invention are LDPE, ethylene/ethyl acrylate copolymer (EEA), ethylene/butyl acrylate copolymer (EBA), ethylene/vinyl acetate copolymer (EVA) and linear low density polyethylene or blends of two or more thereof. Preferred blends are LDPE/LLDPE, LDPE/EEA, LDPE/EBA, and LDPE/EEA/LLDPE. The ethylene/alkyl acrylate copolymers employed in the blends or by themselves preferably contain from 1 to 30 weight percent (based on the total polymer including any blended polymer) of alkyl acrylate. Polymers particularly preferred for use in the process of the present invention are EEA, EBA or blends of LDPE with EEA or EBA wherein the total alkyl acrylate content in the polymer lies in the range 0.5 to 5 weight percent.

The melt index of the polymer used in the process of the present invention suitably lies in the range 0.1 to 10 (ASTM D1238, 2.16 Kg load at 190° C.).

The process of the present invention is suitably carried out by mixing the polymer D or E and the azidosilane in conventional polymer melt blending or melt extrusion apparatus at a temperature at which the components can be thoroughly homogenised, and then raising the temperature, if necessary, to cause the azidosilane to decompose and graft to the polymer. The components can be mixed, for example using multiroll mills, screw mills, continuous mixers, extruders, compounding extruders or Banbury mixers.

If desired, the azidosilane can be absorbed into the polymer, at room or elevated temperature prior to carrying out the reaction. For example, polyethylene or EEA copolymer pellets or powder can be contacted with the azidosilane, preferably at a temperature at which the azidosilane is liquid, and absorption is allowed to take place until substantially all the azidosilane has been absorbed. The powder or pellets can be stored in this condition if desired. Minor amounts of other additives, for example, silanol condensation catalyst, antioxidant, plasticizers, processing aids, metal deactivators, pigments, heat and light stabilizers and antistatic agents can be incorporated during the absorption, or at a later stage if desired.

During the reaction of the ezidosilane with the polymer, nitrogen gas is evolved as a by-product. If it is desired to remove the by-product nitrogen from the produced crosslinkable polymer, suitable venting means can be employed.

However, in some circumstances, for example when it is intended to produce a cellular product directly by extruding a mixture of the azidosilane and polymer, it can be desirable to prevent the nitrogen from escaping from the polymer. Under these circumstances, nucleating agents and/or additional blowing agents can be added to the mixture if desired.

The produced crosslinkable polymer can be crosslinked by exposure to water, preferably in the presence of a silanol condensation catalyst. The silanol condensation catalyst can be incorporated at any stage. For example it can be included in the starting mixture of polymer and azidosilane; or it can be incorporated in the crosslinkable polymer by absorption thereof into the crosslinkable polymer in pellet or powder form, or by soaking articles shaped from the crosslinkable polymer in a solution or suspension of said catalyst. Yet another method of incorporating the silanol condensation catalyst is to prepare a masterbatch concentrate of the catalyst in a suitable compatible polymer and to add the masterbatch (e.g. in pelleted form) to the crosslinkable polymer, also in pelleted form, and then to extrude the mixture.

Any of the silanol condensation catalysts known in the art for crosslinking polymers containing hydrolysable silane groups can be suitably employed in the present invention. Examples of suitable classes of silanol condensation catalysts are organic and inorganic acids and alkalis, and metal compounds, for example complexes or carboxylates of lead, cobalt, iron, nickel, zinc and tin. Specific examples of the silanol condensation catalyst are dibutyl tin dilaurate, dibutyl tin diacetate, dibutyl tin dioctoate, stannous acetate, stannous caprylate, lead naphthenate, zinc caprylate, cobalt naphthenate; ethylamines, dibutylamine, hexylamines, pyridine; inorganic acids such as sulfuric acid and hydrochloric acid; and organic acids such as toluenesulfonic acid, acetic acid, stearic acid and maleic acid. Carboxylates of tin are preferred. Particularly preferred silanol condensation catalysts are dialkyl tin carboxylates, for example dibutyl tin dilaurate, dibutyl tin dipalmitate, dibutyl tin distearate, dioctyl tin dilaurate and dibutyl tin maleate.

The silanol condensation catalyst is preferably blended into the crosslinkable polymer or into the components used to form the polymer.

The quantity of silanol condensation catalyst employed is suitably in the range 0.001 to 3.0 moles, preferably in the range 0.003 to 0.05 moles per mole of silyl units in the crosslinkable polymer.

Generally speaking, the quantity of the silanol condensation catalyst is in the range of 0.001 to 10% by weight, preferably 0.01 and 5% by weight, most preferably 0.03 to 3% by weight, relative to the quantity of crosslinkable polymer in the composition.

The crosslinkable polymer of the present invention and compositions based thereon can be used to manufacture crosslinked products using the technology known in the manufacture of articles from conventional silyl polymers. For example, the polymer and its compositions can be used in blow-moulding, injection-moulding, film-blowing, calendering, extrusion, roto-moulding and extrusion-coating techniques. The polymer composition is particularly preferred for wire and cable coating applications.

Articles fabricated from the composition of the present invention can be readily crosslinked by exposure to water, steam or moist air with the aid of a silenol condensation catalyst and, in general, relatively fast rates of cure are obtained.

The invention is further illustrated in the following Example.

EXAMPLE 7.58 (30 mmole) azido propyl triethoxy silane sold under the trade designation Si-250 by Degussa was soaked into 1333 g of a low density polyethylene having a melt flow index of 0.2 dg/min (ASTM D1238) and a density of 0.919 g/cm$^3$ (ASTM D2839) at 70° C. for 1 hour. The resulting dry pellets (0.56% Si) were added to the hopper of a 25 mm Gothfert extruder (26 L/D) equipped with a PE screw and a 3 mm circular die. The extrusion temperatures were 220°, 250°, 260°, 260° C. from the hopper to the die. At a screw-speed of 10 RPM, the extrudate was observed to contain large voids and had a celluler appearance. Film, pressed from the extrudate, was examined by FTIR and showed peaks corresponding to ethoxy silane groups (1200–900 cm$^{-1}$).

The film could be cured by steeping in aqueous emulsion of dibutyl tin dilaurate.

I claim:

1. A crosslinkable polymer comprising an organic polymer, and pendant substituents having the general formula:

$$-NQ(X)_m Si(OR)_3$$

wherein the nitrogen atom N is connected to a carbon atom in the organic polymer, Q is a hydrogen atom or represents an additional connection to a carbon atom present in the organic polymer, X is a divalent hydrocarbyl group having one to six carbon atoms, m is zero or one and R is an alkyl group containing one to twenty carbon atoms.

2. A crosslinkable polymer as claimed in claim 1 in which the organic polymer is a hydrocarbon polymer comprising only carbon-hydrogen and carbon-carbon bonds.

3. A crosslinkable polymer as claimed in claim 1 in which the pendant substituents comprise 0.1 to 20 weight percent of the total weight of the crosslinkable polymer.

4. A crosslinkable polymer as claimed in claim 1 comprising (A) 0.1 to 20 weight percent of pendant substituents having the general formula:

$$-NQ(X)_m Si(OR)_3$$

wherein the nitrogen atom N is connected to a carbon atom in the organic polymer, Q is a hydrogen atom or represents an additional connection to a carbon atom present in the organic polymer, X is a divalent hydrocarbyl group having one to six carbon atoms, m is zero or one and R is an alkyl group containing one to twenty carbon atoms and an organic polymer comprising either (B) 80 to 99.9 weight percent of polymerized or copolymerised units of one or more monomers selected from the group consisting of ethylene and $C_3$ to $C_{12}$ alpha-olefins or (C) 50 to 99.8 weight percent of copolymerised units of one or more monomers selected from the group consisting of ethylene and $C_3$ to $C_{12}$ alpha-olefins or 0.1 to 49.9 weight percent of one or more comonomers selected from alkyl esters of unsaturated carboxylic acids, alkylene esters of saturated carboxylic acids, alkylene ethers or unsaturated nitriles.

5. A process for preparing a crosslinkable polymer comprising reacting together a mixture comprising (A) an azido silane compound having the general formula $$N_3-(X)_m Si(OR)_3$$

wherein X is a divalent hydrocarbyl group having one to six carbon atoms,

R is an alkyl group containing one to twenty carbon atoms and m is zero or one and an organic polymer which is either (B) a polymer or copolymer of one or more monomers selected from the group consisting of ethylene and $C_3$ to $C_{12}$ alpha-olefins or (C) a copolymer comprising 50 to 99.9 weight percent of copolymerised units of one or more monomers selected from the group consisting of ethylene and $C_3$ to $C_{12}$ alpha-olefins or 0.1 to 80 weight percent of copolymerized units of one or more comonomers selected from alkyl esters of unsaturated carboxylic acids, alkylene ethers or acrylonitrile;

the reaction being carried out under conditions which cause the azidosilane to graft to the polymer with the elimination of nitrogen gas.

6. A process as claimed in claim 5 in which m in the general formula of the azidosilane is one and X is methylene, dimethylene or trimethylene.

7. A Process as claimed in claim 5 or claim 6 in which R in the general formula of the azidosilane is methyl, ethyl, n-propyl or n-butyl.

8. A process as claimed in which the organic polymer is ethylene-ethyl acrylate copolymer, ethylene-butyl acrylate copolymer or blends of low density polyethylene with ethylene-ethyl acrylste copolymer or ethylene-butyl acrylate copolymer; the total alkyl acrylate content being in the range 0.5 to 5 weight percent.

9. A process for producing a crosslinked polymer comprising contacting a crosslinkable polymer as claimed in any one of claims 1 to 4 with water in the presence of a silanol condensation catalyst.

10. A composition comprising a crosslinkable polymer as claimed in any one of claims 1 to 4.

* * * * *

UNITED STATES PATENT AND TRADEMARK OFFICE
CERTIFICATE OF CORRECTION

PATENT NO. : 4,959,413

DATED : September 25, 1990

INVENTOR(S) : JEFFREY D. UMPLEBY

It is certified that error appears in the above-identified patent and that said Letters Patent is hereby corrected as shown below:

Col. 1, l. 39, correct spelling of the word "silanol"

Col. 1, l. 48-49, correct spelling of the word "pelleted"

Col. 2, l. 7, correct spelling of the word "hydrolysable"

Col. 2, l. 48, insert a comma (,) after the word "acids,"

Col. 3, l. 17, there should be a semicolon after the word "acrylonitrile;"

Col. 4, l. 41, correct spelling of the word "azidosilane"

Col. 4, l. 50, correct spelling of the word "circumstances"

Col. 4, l. 66-67, correct spelling of the word "pelleted"

UNITED STATES PATENT AND TRADEMARK OFFICE
CERTIFICATE OF CORRECTION

PATENT NO. : 4,959,413

DATED : September 25, 1990

INVENTOR(S) : Jeffrey D. Umpleby

It is certified that error appears in the above-identified patent and that said Letters Patent is hereby corrected as shown below:

Col. 5, l. 44, correct spelling of the word "silanol"

Col. 5, l. 62, correct spelling of the word "cellular"

Claim 7, line 1, should read "A process as claimed"

Claim 8, line 1, should read "A process as claimed in claim 5 in which"

Signed and Sealed this

Thirty-first Day of March, 1992

Attest:

HARRY F. MANBECK, JR.

*Attesting Officer*          *Commissioner of Patents and Trademarks*